Aug. 14, 1962 D. L. FAVIN 3,049,675

METHOD AND APPARATUS FOR SYNCHRONIZING OSCILLATORS

Filed Dec. 30, 1960 4 Sheets-Sheet 1

INVENTOR
D. L. FAVIN
BY
Charles Scott Phelan
ATTORNEY

INVENTOR
D. L. FAVIN
BY
ATTORNEY

Aug. 14, 1962 D. L. FAVIN 3,049,675

METHOD AND APPARATUS FOR SYNCHRONIZING OSCILLATORS

Filed Dec. 30, 1960 4 Sheets-Sheet 3

INVENTOR
D. L. FAVIN
BY
Charles Scott Phelan
ATTORNEY

Aug. 14, 1962 D. L. FAVIN 3,049,675

METHOD AND APPARATUS FOR SYNCHRONIZING OSCILLATORS

Filed Dec. 30, 1960 4 Sheets-Sheet 4

INVENTOR
D. L. FAVIN
BY
Charles Scott Phelan
ATTORNEY 3,049,675
Patented Aug. 14, 1962

3,049,675

METHOD AND APPARATUS FOR SYNCHRONIZING OSCILLATORS

David L. Favin, Whippany, N.J., assignor to Bell Telephone Laboratories, Incorporated, New York, N.Y., a corporation of New York Filed Dec. 30, 1960, Ser. No. 79,775
20 Claims. (Cl. 331—44)

This invention relates to a method and apparatus for synchronizing oscillators. In particular the invention relates to synchronized oscillators useful in systems which are dependent upon the recovery of a synchronizing signal frequency, in frequency multiplication or division systems, or in phase detection systems.

This application is a continuation-in-part of my copending application Serial No. 817,783, filed June 3, 1959, now Patent 3,041,540, which is directed to a data wave analyzing system.

One of the basic requisites for synchronizing an oscillatory system has usually been that such system must include means for controlling the system frequency. Typical frequency controlling means have included phase detectors, reactance tubes, saturable reactors, voltage-sensitive capacitors, current-sensitive resistors, or relaxation oscillators. In accordance with the present invention none of these typical frequency controlling devices is employed.

A significant consideration in synchronizing systems which are adaptable for frequency division or multiplication has generally been the relationship between the synchronizing frequency and the synchronized frequency. If a nonrelaxation oscillator is involved it has not heretofore been possible to accomplish frequency multiplication or division except by an integral factor. Relaxation oscillators have been employed for accomplishing frequency changing by certain fractional factors of an input cyclic wave. It is, however, characteristic of both the relaxation and the nonrelaxation oscillators in prior art systems that if an input pulse is omitted from the synchronizing wave the oscillator amplitude and phase falter seriously. Furthermore, if the input frequency drifts it is well known that the amplitude of the oscillations in the output of a synchronized nonrelaxation oscillator decreases significantly.

Accordingly, it is one object of the invention to operate a nonrelaxation free-running oscillator so that the output frequency thereof is at least partially dependent upon the input synchronizing signal amplitude.

It is another object to operate a nonrelaxation free-running oscillator so that it will track changes in an input synchronizing frequency without suffering changes in its own output amplitude.

A further object is to generate a predetermined frequency of cyclic oscillations in response to a pulse train which lacks in its own frequency spectrum an energy component at the wavelength of the desired frequency.

Yet another object of the invention is to change the range of frequencies through which a nonrelaxation free-running oscillator will track an input signal frequency by changing the input signal amplitude and without changing the output signal amplitude.

It is also an object of the invention to change the rational fraction by which a nonrelaxation free-running oscillator operates on an input frequency by changing the input signal amplitude.

In this application the term nonrelaxation oscillator is intended to refer to any oscillator except those in which a time constant circuit maintains a blocking bias on the oscillator to hold it in a predetermined condition of operation for a time interval which is a function of the magnitude of the impedance elements in the time constant portion of the circuit. Thus, the well known multivibrators, blocking oscillators, and the like, are considered to be relaxation oscillators, whereas circuits such as Hartley and phase shift oscillators are considered to be nonrelaxation systems.

The term free-running oscillator is intended to mean an oscillatory circuit which is self-starting and produces continuous oscillations of one form or another upon being energized and in which the application of triggering signals is not required for the continued production of oscillations.

In accordance with an illustrative embodiment of the invention a nonrelaxation free-running oscillator receives synchronizing pulses of adjustable amplitude from some suitable source. These pulses may be cyclic in nature, or they may be noncyclic but occurring in a random manner under the control of a clocking signal. The output of the oscillator is employed to control the sweep time base for an oscilloscope display of the received synchronizing pulses. Suitable apparatus is provided for adjusting the amplitude of synchronizing pulses in the oscillator input in order that the oscilloscope display may be stabilized thereby indicating that the oscillator is operating at a frequency which bears a fixed relationship with respect to the time base of the input pulses.

Once a frequency lock-up has been attained the oscillator will then track input frequency variations within a clutch range that is a function of synchronizing pulse amplitude in the oscillator input circuit. The tracking of the input frequency changes is accomplished within the clutch range of the oscillator without significant change in the amplitude of the output oscillations.

It is a feature of the invention that the oscillator will continue to operate at the frequency to which it is clutched even though a number of successive input pulses may be missing for a time interval which may be as much as an order of magnitude greater than the period of the input signal time base frequency.

It is also a feature of the invention that the output of an oscillator which has been clutched in the manner described may be employed to drive a phase detector circuit to generate a useful control signal which is a function of frequency changes in the input signal time base but which is independent of the amplitude of such input signal.

Though the features of this invention which are believed to be novel are expressed in the appended claims, more complete details of the invention and the further objects and advantages thereof may be more readily comprehended through reference to the following description taken in connection with the accompanying drawings wherein:

Figure 5B:
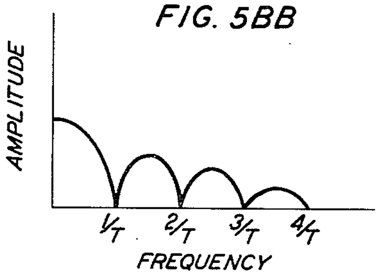
FIGS. 5A through 5F are voltage wave diagrams illustrating the operation of the circuit of FIG. 4.
Figure 5E:
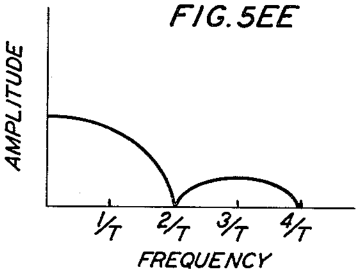
Figure 6:
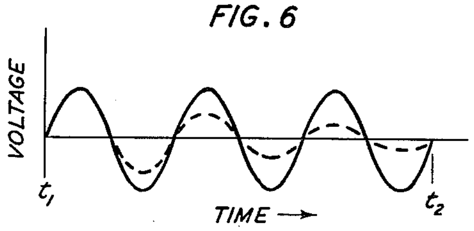
Figure 7:
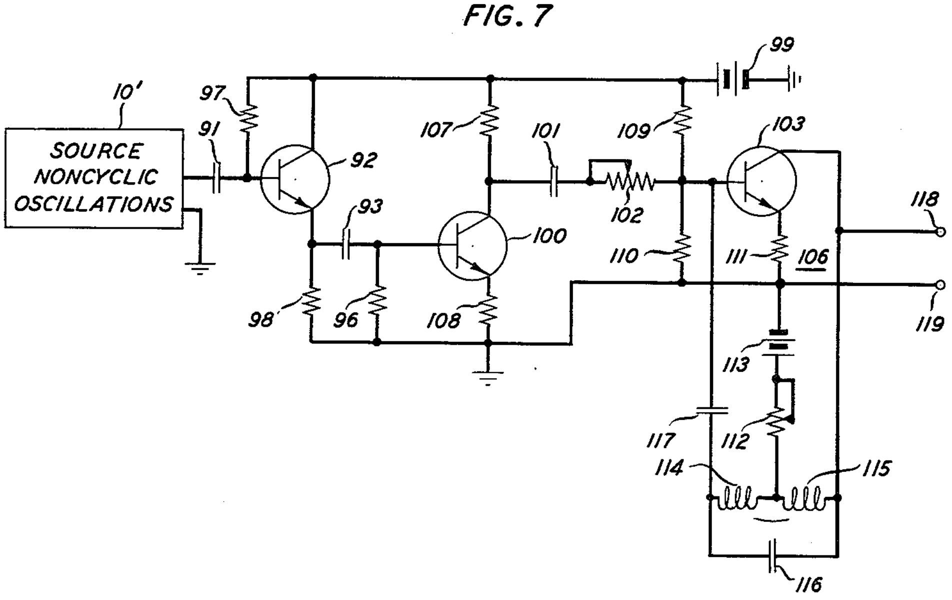
Figure 8:
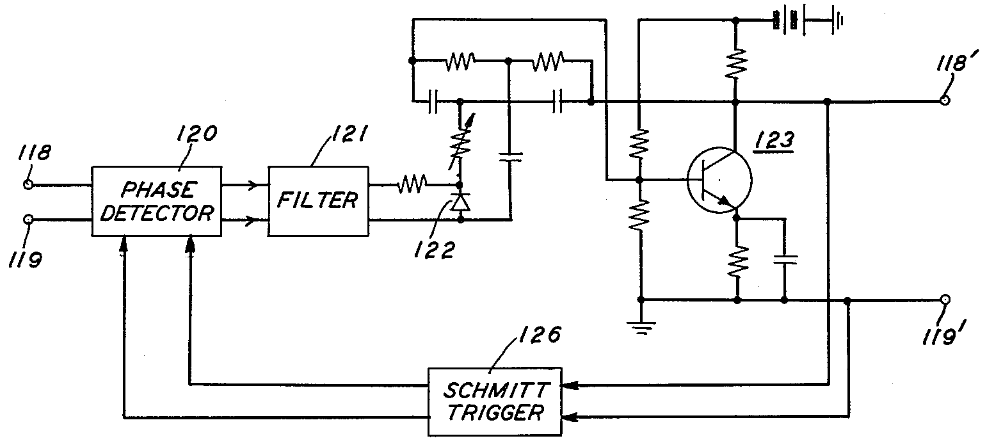
Figure 8:
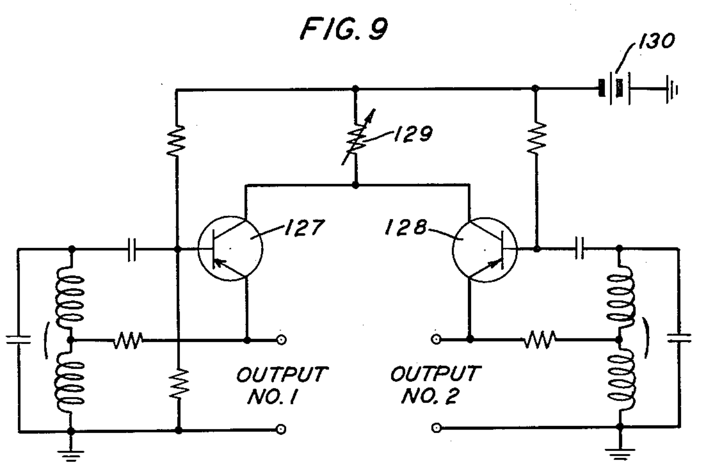

FIGS. 5BB and 5EE are diagrams of the spectrum analyses of the wave illustrated in FIGS. 5B and 5E, respectively;

FIG. 6 is a voltage wave diagram depicting one feature of the invention;

FIG. 7 is a diagram of a modified form of the invention;

FIG. 8 is a diagram of a phase locking circuit which may be added to circuits of the invention to improve the operation thereof; and FIG. 9 is a schematic diagram of an additional embodiment of the invention.

Figure 1:
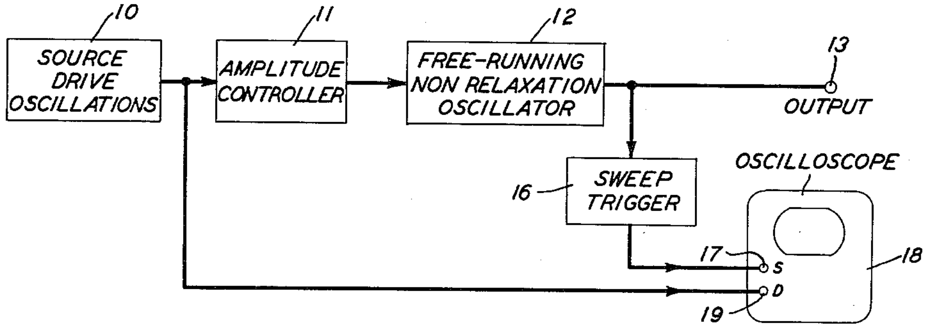
FIG. 1 is a block and single-line diagram of an oscillatory system in accordance with the invention.

In FIG. 1 the block and line diagram illustrates the general concept of the invention for controlling the frequency of a free-running nonrelaxation oscillator by adjusting the amplitude of input synchronizing signals.

A source 10 of drive oscillations may be an oscillator of predetermined frequency, or a source of data signals, or some other source of pulses occurring in accordance with a time base of known frequency. Oscillations from source 10 are applied through a suitable amplitude controller 11 to a free-running nonrelaxation oscillator 12. The exact form of oscillator 12 is not critical as long as it is a free-running nonrelaxation oscillator. The output from oscillator 12 appears at an output connection 13 and is also applied through a suitable trigger circuit 16 to a sweep control input 17 of an oscilloscope 18. Oscillations from source 10 are also applied to the deflection input 19 of oscilloscope 18 to be displayed on a screen in a manner which is controlled by the output frequency of oscillator 12.

Oscillator 12 is initially constructed to operate at a frequency which corresponds to the desired output frequency and bears a known rational, fractional relationship to the time base frequency of the oscillations from source 10. Upon the application of operating energy to the system of FIG. 1, amplitude controller 11 is adjusted to produce a stable trace or Lissajous figure on oscilloscope 18. Once the setting of controller 11 has been established for a particular type of input oscillations the entire apparatus may be shut down, and when it is once more put into operation at a later time it locks in at an output frequency which bears exactly the same rational, fractional relationship with respect to the input signal time base frequency which was characteristic of its operation immediately prior to shutdown.

Figure 2:
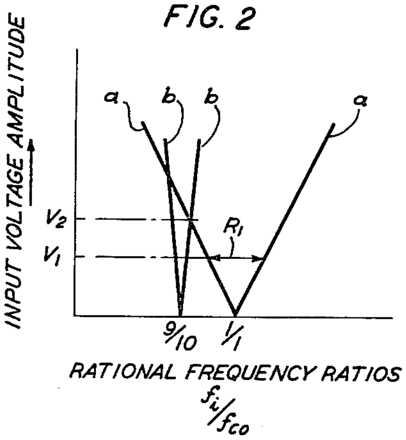
FIGS. 2 and 3 are voltage-frequency diagrams presented to facilitate an understanding of the invention.
Figure 3:
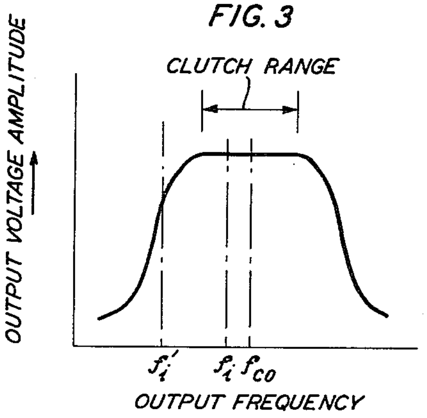

The operation and features of the invention as disclosed in FIG. 1 may be graphically demonstrated by reference to FIGS. 2 and 3. FIG. 2 is a diagram of voltage amplitude at the input of oscillator 12 versus ratios of the input signal time base frequency $f_i$ to the natural oscillatory frequency $f_{co}$ of the clutched oscillator 12. The complete diagram would include a series of V's, each having its apex on the axis of the abscissas, and representing frequency ratios which are equal to, less than, and greater than, unity. In order to preserve the simplicity of the drawing and thereby facilitate an understanding of the invention, only two V's have been shown. Each V defines the limits of the pull-in frequency range for oscillator 12 for various voltage amplitudes at the input thereof. The breadth of each V represents the relative dominance of the mode of oscillator operation which is characteristic of the frequency ratio corresponding to that V. This diagram demonstrates the finding that the mode of operation of oscillator 12 depends upon the ratio of the frequencies of source 10 and oscillator 12 and upon the amplitude of the oscillations coupled to the input of oscillator 12.

Assume, for example, that the V designated *a—a* in FIG. 2 represents a 1:1 ratio of frequencies such as might be encountered in a television picture synchronizing situation. At the voltage amplitude $V_1$ oscillator 12 tracks the time base frequency of the input oscillations through a frequency range $R_1$. That is to say, if the input frequency $f_i$ drifts, or is intentionally changed, by an amount such that the resultant input frequency $f_i$ is related to the natural oscillatory frequency $f_{co}$ of oscillator 12 by a ratio which is within the bounds of the V *a—a* at amplitude $V_1$, oscillator 12 will then continue to track the input frequency; and this tracking will be accomplished with substantially no change in the output amplitude of oscillator 12 as indicated in the clutch range on the voltage amplitude versus output frequency chart of FIG. 3.

If, however, the input frequency $f_i$ drifts, or is changed, by an amount such that the resultant frequency $f_i'$ is related to the natural oscillator frequency $f_{co}$ of oscillator 12 by a ratio which lies outside of the V *a—a* at amplitude $V_1$, oscillator 12 slips back to its natural frequency and continues operation independently of the frequency of the input oscillations. A certain amount of the input oscillation frequency $f_i'$ may nevertheless reach output connection 13 along with the frequency $f_{co}$; but that component $f_i'$ is severely attenuated as indicated in FIG. 3.

Still considering the V diagram *a—a* in FIG. 2, the width of the clutch range may be increased or decreased within the bounds of the V by increasing or decreasing the voltage amplitude at the input of oscillator 12. It has been found that there is an optimum amplitude range which produces output oscillations of unusual stability, and this aspect of the operation will be subsequently discussed. Throughout such changes in the clutch range, however, the output amplitude of oscillator 12 remains substantially constant. Because of this fact an oscillatory system of the type illustrated in FIG. 1 with a 1:1 frequency ratio may provide substantial benefits when employed in systems of the phase detector type. Thus, if a phase detector were connected to output connection 13, it would receive from oscillator 12 oscillations of substantially constant amplitude and varying frequency. Accordingly, the output of the phase detector would depend upon frequency variations at the input to oscillator 12 but would be substantially independent of amplitude variations at source 10 as long as the frequency variations were accomplished within the clutch range of oscillator 12.

Assume that the V diagram designated *b—b* in FIG. 2 represents a 9:10 frequency ratio such as one might encounter in some frequency changing applications. For voltage amplitudes below the voltage $V_2$ oscillator 12 tracks the time base frequency of input oscillations from source 10 faithfully with a 9:10 ratio within clutch ranges defined by the V *b—b* as previosusly discussed. However, for voltage amplitudes above $V_2$ there is a range of input frequencies within the V diagram *b—b*, which may be applied to oscillator 12, and which lie in a region wherein the V's *a—a* and *b—b* overlap. In such areas it has been found that oscillator 12 changes from its oscillatory frequency at the 9:10 ratio to a frequency corresponding to the more dominant mode of operation. In this case the more dominant mode is operation at a 1:1 ratio so oscillator 12 snaps to a frequency which is equal to the input frequency $f_i$. Oscillator 12 will then track the input frequency at this 1:1 ratio through the extent of the V diagram *a—a*. However, by dropping the input voltage amplitude to a level which is below $V_2$ oscillator 12 can be made to drop back to an operating frequency in the 9:10 operation mode. However, the return to the 9:10 mode can take place only when input frequency $f_i$ is at a value that would lie within the V *b—b*.

As previously noted, it has been observed that changes in input amplitude to oscillator 12 cause corresponding changes in the breadth of the oscillator clutch range; but it has been observed that there is an optimum amplitude level for the most stable operation when the input signal includes more than one frequency in either a continuous or a discrete spectrum. The reason for this is not completely understood; but it may be due to the fact that for input voltages which would tend to place oscillator operation in a narrow portion of the V diagram, some instability may be due to drifting of input frequency $f_i$ through a range which is larger than the clutch range. A tendency toward increased time jitter in the output voltage above the optimum amplitude range may be due to the overlap of V diagrams of significant dominance so that oscillator 12 experiences some difficulty in selecting its proper mode of operation as the input frequency $f_i$ is changed or drifts. In other words, the selection of the optimum amplitude represents a compromise among breadth of the V, shape and bandwidth of the input frequency spectrum, and closeness of overlapping V's.

Figure 4:
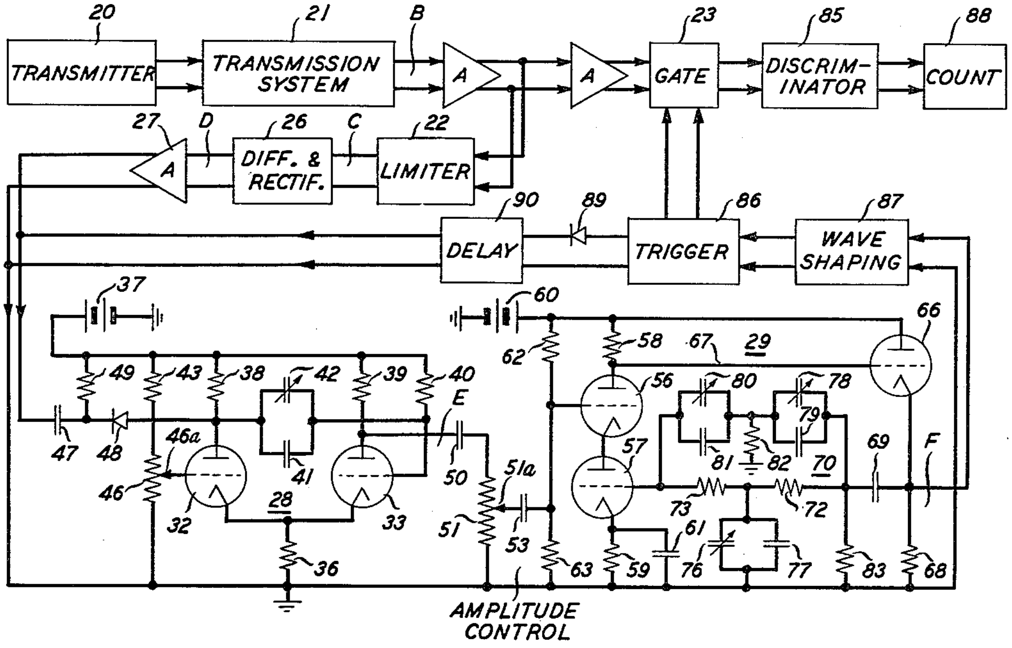
FIG. 4 is a diagram, partially in block and line form and partially in schematic form, of a data transmission system employing an oscillatory arrangement in accordance with the invention.

The circuit of FIG. 4 comprises a data transmission system adapted for testing the suitability of transmission facilities for data signals. This system corresponds generally to that disclosed in FIGS. 4 and 5 of my previously mentioned copending application. A data transmitter 20 generates a data signal of the type illustrated in FIG. 5B. Briefly, such a data wave is produced under the control of a cyclic clock voltage train of oscillations such as those illustrated in FIG. 5A. The initial data wave includes rectangular positive-going pulses and negative-going pulses representing marks and spaces, respectively. That data wave is passed through a band-pass filter in the transmitter to eliminate all frequencies except the frequencies which are essential for representing the data. Consequently, the pass band of this filter is centered on a frequency which is equal to one-half of the bit rate, and the output is a noncyclic train of pulses. Now, however, each pulse has a generally cosinusoidal configuration as illustrated in FIG. 5B rather than the original rectangular configuration. This wave is called a raised cosine wave since it has a positive average direct current value, and it begins at zero time with full mark amplitude. The length of one data bit is indicated on the abscissa of the waveform of FIG. 5B, and any oscillation at the data path frequency must complete a full cycle of oscillation in that time.

The data wave is said to be a random pulse wave since one cannot reliably predict in a particular time slot whether the data bit will be a mark or a space. There is no component of the data bit rate present in the data wave because each pulse of the data wave occupies a time interval equal to the full period of the clock frequency voltage. This fact can be demonstrated by performing a spectrum analysis upon a random data wave which is generated in the manner described. The results of such an analysis are illustrated in FIG. 5BB and show that the spectrum of the data wave does not include an energy component with a wavelength which is equal to the wavelength L of the clock voltage signal in FIG. 5A, or to any integral multiple thereof. The data wave of FIG. 5B is nevertheless synchronous with a fixed periodic time reference, the time reference of the clock voltage of FIG. 5A, in which each time period has a duration corresponding to the duration of the period of a wave at the clock frequency.

Referring to the spectrum analysis of FIG. 5BB, the envelope of the spectrum indicates that the data wave does include an energy component at a frequency equal to one-half of the data bit rate. However, due to its random nature, the wave spectrum does not include at any one particular frequency a useful amount of energy. The energy in any frequency band $\omega$ which may be fined by the frequencies $f_1$ and $f_2$ is $$\int_{f_1}^{f_2} f(\omega)\,d\omega$$

Assuming that a filter would be constructed which would pass only a single frequency, the energy at that single frequency would be found in a band including only one frequency, that is, a band in which $f_1$ is equal to $f_2$ and the integral is therefore zero. If the band is increased to obtain a useful amount of energy such as might be available if a very high quality band-pass filter were employed, the additional frequency components in the band cause a timing uncertainty, jitter, in the output of any circuit controlled by the energy in the increased band. Accordingly, it is not attractive to employ conventional filtering means directly for extracting the data bit frequency, or any other single frequency, from the data wave of FIG. 5B.

Thus, the random data wave of FIG. 5B which is received at the output terminals of the transmission system 21 does not include useful energy at the bit frequency. The received wave is applied to an oscillatory system in accordance with the invention in order to derive from it the time base, or clock, frequency which is implicit in the random wave. At the receiving end of system 21 the data wave is amplified and would ordinarily be applied to some suitable translating means, not shown, for converting the voltage pulses into appropriate representations of the data. However, for test purposes, the signal is applied to a limiter 22 wherein both the positive-going and negative-going excursions of the signal are limited to produce a wave of the type shown in FIG. 5C. The received data wave is also applied after further amplification to a sampling gate 23 which is controlled by pulses generated at the time base frequency of the data wave by a clutched oscillator system in accordance with the invention.

Figures 5A, 5B, 5C, 5D, 5E, 5F:
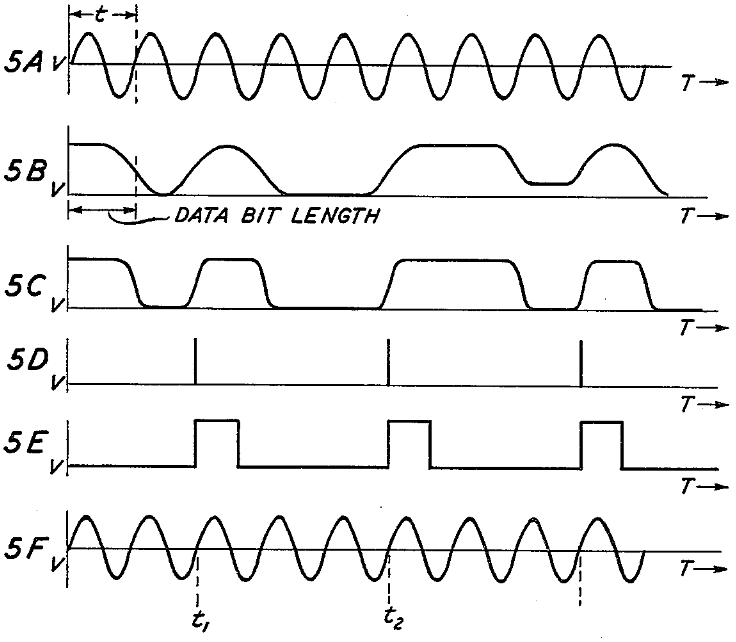

The output of limiter 22 is applied to a differentiating and rectifying circuit 26 for producing positive-going impulses in response to a corresponding voltage transition of the limited data wave at the beginning of the first mark pulse in each series of mark pulses in the data wave. These positive-going impulses, which are illustrated in FIG. 5D, are amplified and inverted by an amplifier 27 and applied to the input of a monostable multivibrator 28. Multivibrator 28 produces a positive-going output pulse in response to each of the amplified differentiator impulses as shown in FIG. 5E.

The unstable operating period of multivibrator 28 is established at a duration corresponding to approximately one-half of the period of an oscillation at the data bit frequency. Exact correspondence between output pulses from multivibrator 28 and one-half of the bit period is not essential, however. Each output pulse from multivibrator 28 is adjusted to amplitude which is sufficient to synchronize a clutched oscillator 29 in accordance with the invention so that the leading edge of each output pulse from multivibrator 28 tends to occur at the same time point in the synchronized oscillatory cycle of oscillator 29. The exact size and duration of such pulses is, of course, a function of the translating devices employed in multivibrator 28 and in oscillator 29 and is a function of the circuit constants employed in each of them.

Multivibrator 28 is a cathode coupled multivibrator circuit in which a tube 32 is normally nonconducting in the absence of an input pulse and a tube 33 is normally conducting. The cathodes of tubes 32 and 33 are connected to ground by a common cathode resistor 36. The anodes of tubes 32 and 33 are connected to a source 37 of operating potential through load resistors 38 and 39, respectively. The control grid of tube 33 is connected to source 37 through a resistor 40, and it is also connected to the anode of tube 32 by the parallel-connected capacitors 41 and 42. Capacitor 42 is adjustable and controls the duration of multivibrator output pulses in the usual manner. Bias level for the control grid of tube 32 is fixed by a potential divider which includes a resistor 43 connected in series with a potentiometer 46 between the terminals of source 37. An adjustable tap **46*a* is connected to the control grid of tube 32. Negative-going input pulses, inverted pulses of FIG. 5D, from amplifier 27 are applied to the anode of tube 32 through a series circuit including a coupling capacitor 47 and a diode 48. Diode 48 is poled for conduction of current away from tube 32. A resistor 49 is connected between the positive terminal of source 37 and the cathode of diode 48** for establishing the conducting point of the diode.

Each negative-going input pulse from amplifier 27 causes multivibrator 28 to produce a positive-going pulse in a well known manner at the anode of tube 33. These pulses are illustrated in FIG. 5E. Since capacitor 42 has been adjusted as previously noted so that the pulses of FIG. 5E correspond in duration to one-half of the period of the clocking wave in FIG. 5A, the spectrum of the pulses in FIG. 5E includes an energy component at the wavelength which corresponds to the period of the clocking voltage. This can be seen in the spectrum analysis of FIG. 5EE.

Positive pulses at the anode of tube 32 are coupled by a capacitor 50, a potential divider 51, and an additional coupling capacitor 53 to the input of clutched oscillator 29. Potential divider 51 with its adjustable tap 51*a* provides control over the amplitude of synchronizing pulses in the input of oscillator 29. Coupling capacitors 50 and 53 prevent interaction between the steady state potentials in multivibrator 28, oscillator 29, and potential divider 51.

Clutched oscillator 29 includes a cascode amplifier type of stage and a cathode follower stage connected in tandem. The cascode stage includes tubes 56 and 57 which have the space current paths thereof connected in series with an anode load resistor 58 and a cathode self-bias resistor 59 between ground and the positive terminal of a source 60 of operating potential. A bypass capacitor 61 shunts resistor 59 in the usual manner. The normal bias level for the control grid of tube 56 is established by means of a potential divider including the series-connected resistors 62 and 63 which are connected between the terminals of source 60 and which have the common terminal thereof connected to the control grid of tube 56. The output of the cascode stage is directly coupled from the anode of tube 56 to the control grid of a cathode follower tube 66 through a connecting lead 67. Tube 66 is connected in series with its cathode load resistor 68 between the terminals of source 60. The output of tube 66 is fed back from the cathode thereof to the control grid of tube 57 in a regenerative feedback path which includes a coupling capacitor 69 and a frequency-sensitive impedance network 70. The output voltage of oscillator 29 is a sine wave corresponding in frequency and configuration to the clocking wave of FIG. 5A and appears across resistor 68. This output wave is illustrated in FIG. 5F.

Network 70 is a twin-T network which provides in the pass-band thereof the necessary phase shift for regenerative feedback from the cathode follower stage to the cascode stage. Network 70 includes a high pass filter section and a low pass filter section connected in parallel and sharply tuned for minimum attenuation in a narrow band of frequencies which includes the desired output frequency of the clutched oscillator. The low pass filter section includes in the series path resistors 72 and 73 and in the shunt path the parallel-connected variable capacitor 76 and fixed capacitor 77. The high pass filter section of twin-T network 70 includes in the series path the parallel-connected variable capacitor 78 and fixed capacitor 79 in series with the parallel-connected variable capacitor 80 and the fixed capacitor 81. A resistor 82 is connected in the shunt path of the high pass filter section. A resistor 83 connected between ground and the common terminal of coupling capacitor 69 and network 70 completes the direct current bias circuit from ground to the control grid of tube 57 through the resistors 72 and 73. Variable capacitors are provided in network 70 for cooperating with capacitors 41 and 42 in the cross coupling network of multivibrator 28 to vary the clutched oscillator frequency and phase shift and the multivibrator output pulse duration through small ranges in order to adjust these circuits as may be necessary for optimum performance.

Considering the operation of the circuits of FIG. 4, the negative-going impulses in the output of amplifier 27 trigger multivibrator 28 at a time which coincides with the leading, or positive-going, edge of a mark pulse. The multivibrator output pulse is coupled to the input of the cascode stage of oscillator 29 with sufficient amplitude to accomplish synchronization, that is, if pulses were received from multivibrator 28 in a cyclic manner, oscillator 29 would oscillate at the frequency of such pulses even though its natural oscillatory frequency may not be the same as the frequency of the cyclic pulses. The technique of synchronizing resonant oscillators and astable multivibrators by means of a cyclic input wave is, of course, well known in the prior art. However, noncyclic input waves are not generally employed in the prior art because the oscillator output frequency shifts back to its natural frequency almost immediately upon the loss of a synchronizing pulse.

It is known that the oscillator circuit 29 will oscillate at some natural frequency in the pass band of network 70 if no synchronizing pulses are applied thereto. However, it has been found that once oscillator 29 has been synchronized at any of the frequencies in the above mentioned pass band, it continues to operate at the synchronized frequency in the absence of further synchronizing pulses, and without substantial decrement, for a period of time which is relatively long when compared to the period of its output oscillations.

Without limiting the invention to a particular mode of operation, it is thought that the clutching tendency of oscillator 21 may be due at least in part to the relation between the amplitude of the output pulse of multivibrator 28 and the operating point of the cascode stage tubes in oscillator 29. It has been observed that the output voltage versus frequency response of oscillator 29 exhibits a flat, or plateau, region which coincides with the clutch range and the region of maximum output voltage amplitude. This type of operation, which was discussed in connection with FIG. 3, is in marked contrast to the usual rounded peak exhibited in circuits employing twin-T filter networks. It is thought that the plateau effect and the clutching tendency are related and that the plateau effect in the oscillator response characteristic may result from driving at least one tube of the cascode stage into a nonlinear portion of its characteristic. Reduction of input pulse amplitude to oscillator 29 reduces the plateau width and increases the resulting jitter observed in the position of output pulses from oscillator 28 for synchronized frequencies which are widely separated from the natural oscillating frequency of the circuit.

In one practical embodiment of the circuit of FIG. 4, oscillator 29 had a natural frequency of oscillation at 50 kilocycles per second and a clutch range between 48 and 51 kilocycles per second. The output from multivibrator 28 was a pulse of approximately 50 volts amplitude and 10 microseconds duration. The following circuit elements were employed in the last mentioned embodiment:

| | |
|---|---|
| Tubes **32**, **33**, **56**, **57** and **66** | Western Electric 396A. |
| Sources **37** and **60** | 300 volts. |
| Diode **48** | Western Electric 400A. |

| Resistors: | Ohms |
|---|---|
| R36 | 4,700 |
| R38 | 18,000 |
| R39 | 18,000 |
| R40 | 470,000 |
| R43 | 150,000 |
| R46 | 100,000 |
| R49 | 33,000 |
| R51 | 330,000 |
| R52 | 100,000 |
| R58 | 24,000 |
| R59 | 300 |
| R62 | 220,000 |
| R63 | 110,000 |
| R68 | 47,000 |
| R72 | 14,700 |
| R73 | 14,700 |
| R82 | 14,700 |
| R83 | 1 |

Capacitors:

| | | |
|---|---|---|
| C41 | micromicrofarads | 50 |
| C42 | do | 7 to 45 |
| C47 | microfarads | 10 |
| C50 | do | 10 |
| C53 | do | 10 |
| C61 | do | 50 |
| C69 | micromicrofarads | 0.1 |
| C76 | do | 600 |
| C77 | do | 7 to 45 |
| C78 | do | 7 to 45 |
| C79 | do | 130 |
| C80 | do | 7 to 45 |

It has been found that the application of a random data wave, with as many as 10 successive bit periods having no space-to-mark transitions therein, to oscillator 29, with the above recited circuit constants, produced a train of 50 kilocycles per second oscillations across resistor 68 with less than one electrical degree of jitter. In other words, synchronizing input pulses could be removed entirely from the input of clutched oscillator 29 for a time equivalent to 10 cycles of oscillation without producing as much as one electrical degree, or 55 millimicroseconds, of shift in the time of occurrence of the resulting output oscillations.

The output wave of FIG. 5F is coupled from resistor 68 to the input of a trigger circuit 86 through suitable wave shaping circuits 87 for forming and phasing the output wave of oscillator 29 to operate trigger circuit 86. One output of trigger circuit 86 operates gate 23 to pass samples of the data wave of FIG. 5B to a pulse amplitude discriminator 87 which passes only those pulses having peak amplitudes within a certain predetermined range to a counter 88. A second output of trigger circuit 86 may be applied through a rectifier 89 and a delay circuit 90 to the input of multivibrator 28 to form a bootstrap circuit which enables oscillator 21 to synchronize itself provided that it is first synchronized by an incoming data wave. This latter adaptation reduces the jitter in oscillator output wave FIG. 5F, but it is not essential to the operation of the clutched oscillator.

The overall circuit of FIG. 4 comprises a data system with a bidiameter connected to the receiving end thereof as described in detail in my previously mentioned copending application. The operation of the portion of the system including clutched oscillator 29 corresponds with the operation previously described in connection with FIG. 1 in that one may adjust tap 51*a* to control the amplitude of synchronizing pulses in the input of oscillator 29. Such adjustment also controls the width of the oscillator clutch range as described in connection with FIGS. 2 and 3.

In order to set up the initial operation of oscillator 29 an oscilloscope is arranged in the manner indicated on FIG. 1 with its deflection input connected to the output of transmission system 21 and its sweep input connected through an appropriate sweep trigger circuit to the output produced across resistor 68 in clutched oscillator 29.

The ability of oscillator 29 to operate within the clutch range with substantially unchanged amplitude in the absence of synchronizing pulses is illustrated in FIG. 6 which is an enlarged form of the portion of FIG. 5F between the times $t_1$ and $t_2$. A synchronizing pulse occurred at time $t_1$ and thereafter no additional pulses occurred for 3 cycles of clutch oscillator operation. FIG. 6 shows that the output amplitude of the clutched oscillator, shown by the solid line curve, was substantially unchanged in this interval. FIG. 6 also shows a broken line curve illustrating the decrement in the output amplitude of a passive tuned circuit which is conventionally employed for wide band synchronizing signal recovery and which was subjected to the same operating conditions as the circuit of FIG. 4. That is, a synchronizing pulse was applied at time $t_1$ and no further synchronization was applied for 3 cycles. If a relaxation oscillator had been employed for synchronizing signal recovery, it would snap back to its natural frequency as soon as input pulses disappeared. It is clear from FIG. 6 that on ordinary oscillator synchronization method almost completely loses its input time base frequency component in an interval as short as 3 cycles whereas it has been found that an oscillator which is synchronized in the manner described herein can hold its synchronizing time base frequency for as many as 10 cycles of operation without substantial loss in output amplitude.

FIG. 7 shows a transistor clutched oscillator system employing an ordinary Hartley type of oscillator. The source 10' of drive oscillations may provide oscillations of the same type illustrated in FIG. 5B. These oscillations are applied through a coupling capacitor 91 and a transistor 92 connected in an emitter-follower circuit to a differentiating circuit including a capacitor 93 and a resistor 96. Biasing resistors 97 and 98 supply operating current to transistor 92 from a battery 99 so that transistor 92 operates as a limiter. Positive-going differentiated pulses are amplified in a transistor 100 and coupled through a capacitor 101 and an amplitude controlled rheostat 102 to the base electrode of a transistor 103 in the Hartley oscillator circuit 106. Resistors 107 and 108 provide proper bias for operating transistor 100 as an amplifier. Resistors 109 and 110 co-operate with a resistor 111 and a rheostat 112 to supply basic operating current to transistor 103 from battery 99 and from a further battery 113. Inductively coupled coils 114 and 115 co-operate with a capacitor 116 to develop feedback potentials in the usual manner for a Hartley oscillator and these potentials are coupled to the base electrode of transistor 103 by a capacitor 117. A cyclic, clutched oscillator, output wave of the type illustrated in FIG. 5F is produced at output terminals 118 and 119.

It will be noted that a multivibrator is not used in the wave shaping circuits of the oscillatory system of FIG. 7. It was found that for one particular application of this system source 10' provided a data wave of the type illustrated in FIG. 5B with 700 bits per second. The clutched oscillator 106 was tuned to approximately 700 cycles per second and operated satisfactorily to reproduce a cyclic oscillatory wave at 700 cycles per second at output terminals 118 and 119 when rheostat 102 had been set to its optimum value for minimum jitter as described in connection with FIGS. 1 through 3. Circuit elements listed below were employed in the FIG. 7 embodiment just described:

| | |
|---|---|
| Transistors **92**, **100**, and **103** | 2N168A. |
| Batteries **99** and **113** | 22 volts. |

Resistors:

| | Ohms |
|---|---|
| R96 | 33,000 |
| R97 | 470,000 |
| R98 | 6,800 |
| R102 | 100,000 |
| R107 | 12,000 |
| R108 | 2,700 |
| R109 | 470,000 |
| R110 | 47,000 |
| R111 | 160 |
| R112 | 50,000 |

Capacitors:

| | |
|---|---|
| C91 | 0.1 micromicrofarads. |
| C93 | 0.01 micromicrofarads. |
| C116 | 0.01 micromicrofarads. |
| C117 | 40 microfarads. |
| Coil 114–115 | Western Electric 1533M. |

In another application, source 10' provided bursts of 1800 cycles per second energy in a train of bursts having an envelope corresponding to the wave of FIG. 5B. This envelope was clocked at 900 cycles per second so oscillator 106 was tuned to approximately that frequency. It was found in this application that the limiter, differentiator, and amplifier circuits of FIG. 7 could be eliminated and the bursts of 1800 cycle energy applied directly to capacitor 101. In this application oscillator 106 locked in solidly on the 900 cycle per second time base frequency when rheostat 102 had been adjusted for minimum time jitter.

In each case described in connection with FIG. 7 the setting for amplitude control rheostat 102 was determined by adjusting rheostat 102 until a stable Lissajous figure was obtained on an oscilloscope which had its deflection controlled by the output of source 10' and its sweep controlled by the output of oscillator 106.

FIG. 8 illustrates a circuit which may be connected to output terminals 118 and 119 of oscillator 106 in FIG. 7 or to the output of any other clutched oscillator to provide still further improvement in the phase lock of the oscillator in a manner which is disclosed in some detail in the L. Howson Patent 2,774,872. Briefly, a phase detector circuit 120, which man be a multivibrator, has one input connected to terminals 118 and 119 and has the output thereof connected through a filter 121 to a voltage-sensitive diode 122 which is connected in a twin-T feedback network of an oscillator 123. The output of oscillator 123 appears at terminals 118' and 119' and is also coupled through a Schmitt trigger circuit 126 to a second input of phase detector 120. Oscillator 123 is adapted to operate naturally at approximately the same natural frequency as oscillator 106. Any difference in the actual operating frequencies thereof causes a change in the output of phase detector 120 which thereby changes the operating resistance of diode 122 in such a direction as to reduce the frequency difference. It has been found that in a data system of the type illustrated in FIG. 7 satisfactory operation was produced with the circuit of FIG. 7 alone, and the addition of the circuit of FIG. 8 produced no noticeable change in the operation of the data system per se. However, with an oscilloscope arranged as indicated in FIG. 1, with the deflection controlled by the output of source 10' and with the sweep controlled by the output of the terminals 118 and 119, there resulted a reduction of approximately 10:1 in the amount of time jitter observed with the circuit of FIG. 8 connected in the system.

FIG. 9 discloses a further embodiment of the invention wherein two noncritical oscillators operating at different frequencies may be easily locked into step in accordance with the invention by adjusting the input signal amplitudes of both of them simultaneously. The two oscillators are two Hartley oscillators employing transistors 127 and 128, respectively. These oscillators are substantially the same in configuration but are designed individually to produce at the output terminals designated Output #1 and Output #2 oscillations at the two different frequencies desired. These oscillations are phase locked with one another by connecting an adjustable resistor 129 in the collector electrode paths of both transistors between the collector electrodes and a battery 130 which supplies operating current.

In one application of the circuit of FIG. 9, 1800-cycle oscillations were produced at Output #1 and 900-cycle oscillations were produced at Output #2. Each oscillator is separately tuned to its intended operating frequency range. The two oscillators are then coupled together through resistor 129 to battery 130 as shown in FIG. 9. Oscillations occurred in the two circuits substantially independently insofar as their phase relationships were concerned until resistor 129 was adjusted to a critical magnitude range of approximately 80 to 100 ohms. Then the two oscillators locked up and operated in a fixed phase relationship and with a fixed ratio of 2:1 between their frequencies.

Although this invention has been described in connection with particular applications and embodiments thereof, it is to be understood that additional applications and embodiments incorporating the underlying principles of the invention will be obvious to those skilled in the art and are included within the spirit and scope of the invention.

What is claimed is:

1. A clutched oscillator circuit for generating cyclic oscillations at a predetermined frequency in response to noncyclic synchronizing pulses which do not include said frequency but which are controlled by a clock voltage at said frequency, said circuit comprising first and second electron tubes each having an anode, a cathode, and a control grid, means for connecting the space current paths of said first and second tubes in series between the terminals of a source of operating potential, a source of said noncyclic pulses connected between the cathode of said first tube and the grid of said second tube, a cathode follower circuit, means connecting the anode of said second tube to the input of said cathode follower circuit, and a twin-T network connecting the output of said cathode follower circuit to the control grid of said first tube for supplying regenerative feedback thereto, said network including a low pass filter section and a high pass filter section connected in parallel to provide substantially lower attenuation at a frequency in a range of frequencies including said predetermined frequency than at frequencies higher and lower than the frequencies within said range.

2. A clutched oscillator for generating cyclic oscillations at a predetermined frequency, said oscillator comprising first, second, and third electron tubes each having an anode, a cathode, and a control grid, means for connecting the space current paths of said first and second tubes in series, means for applying operating potential to all of said tubes, a connection between the anode of said second tube and the control grid of said third tube, a parallel-T network connected for regeneratively coupling the cathode of said third tube to the control grid of said first tube, said network providing substantially lower attenuation at a frequency in a range of frequencies including said predetermined frequency than at frequencies outside of said range, and a source of random pulses of predetermined time phase connected between the cathode of said first tube and the control grid of said second tube for synchronizing said clutched oscillator circuit.

3. A synchronized oscillatory circuit for generating cyclic oscillations at a predetermined frequency, said circuit comprising a cascode amplifier, a cathode follower having its input connected to the output of said amplifier, a twin-T band-pass network connected in a feedback path between the output of said cathode follower and the input of said amplifier, said network being tuned for minimum attenuation in a predetermined frequency band, a source of noncyclic pulses of varying pulse width, each of said pulses occurring in predetermined time phase relationship with respect to said frequency, and means for coupling the output of said pulse source to the input of said amplifier.

4. A synchronized oscillatory circuit for generating cyclic oscillations at a predetermined frequency, said circuit comprising a nonresonant phase shift oscillator which is naturally oscillatory at a different frequency, a source of noncyclic pulses of variable pulse width, said pulses not including said frequency but being controlled by a clock at said frequency, and means for applying said pulses to the input of said oscillator, said pulses being of sufficient amplitude to synchronize said oscillator at said predetermined frequency.

5. A synchronized oscillator circuit responsive to an input train of noncyclic pulses for generating a cyclic output wave at a desired frequency which is not present in the input wave, said circuit comprising a source of noncyclic pulses of variable pulse width and controlled by a clock at said desired frequency, means connected to the output of said source and responsive to said noncyclic pulses for generating further noncyclic pulses of a substantially uniform pulse width which is less than the minimum width of said variable pulses, a nonresonant tuned oscillator, said oscillator being tuned for maximum gain over a narrow frequency band which includes said desired frequency, and means for applying said further pulses to the input of said oscillator for synchronizing said oscillator to said desired frequency.

6. A synchronized oscillator circuit responsive to an input train of noncyclic data pulses for generating a cyclic output oscillation wave at a frequency corresponding to the data bit rate of said data pulse train, which frequency is not a component in said pulse train, said circuit comprising a source of said noncyclic data pulses, an amplifier, a nonresonant tuned regenerative feedback path for coupling the output of said amplifier to the input thereof for the generation of cyclic oscillations, said feedback path being tuned for maximum transmission through said amplifier in a narrow band of frequencies including said frequency, and means for applying said noncyclic pulses to the input of said amplifier for synchronizing said cyclic oscillations at said frequency in said output circuit.

7. A synchronized, nonresonant, tuned oscillator having an output voltage versus frequency characteristic with a flat-peaked portion over a predetermined band of frequencies including the natural oscillatory frequency thereof, said oscillator comprising a first and a second vacuum tube each having at least an anode, a cathode, and a control grid, a source of operating potential, means for connecting the space current paths of said tubes in series between the terminals of said source, a source of noncyclic pulses having the output thereof connected between the cathode of said first device and the control grid of said second device, each of said pulses being of sufficient amplitude to drive at least one of said tubes into a non-linear portion of its grid voltage versus plate current characteristic, a cathode follower having the input thereof connected to the anode of said second tube, means connecting the output of said cathode follower to the control grid of said first tube to complete an oscillatory loop circuit, the last mentioned means comprising a bandpass filter having minimum attenuation at said natural oscillatory frequency.

8. A synchronized nonresonant tuned oscillator having an output voltage versus frequency characteristic with a flat-peaked portion over a predetermined band of frequencies which includes the natural oscillatory frequency thereof, said oscillator comprising a cascode amplifier stage having two input connections and one output connection, a source of noncyclic pulses connected to one of said input connections for synchronizing said oscillator, said pulses being synchronous with a fixed periodic time reference in which each time period is equal to the period of an oscillation wave of a predetermined frequency in said band, each of said pulses being of sufficient amplitude to drive said amplifier into a nonlinear portion of its operating characteristic, and means for regeneratively coupling said output connection to a second one of said input connections for generating oscillations at said predetermined frequency in said output connection, the last mentioned means comprising a bandpass filter having minimum attenuation at said natural frequency.

9. In an oscillatory circuit for generating cyclic oscillations at a first frequency in response to a drive pulse wave of noncyclic nature with no spectral lines at said first frequency, means receiving said noncyclic wave and generating in response thereto a further noncyclic wave having a spectral line at said first frequency, a nonrelaxation, free-running oscillator having a natural oscillatory frequency included within a determinable range of frequencies, the limits of said range being a function of the amplitude of pulses applied to said oscillator, and means applying said further noncyclic wave to said oscillator with adjustable amplitude.

10. The method for operating a free-running nonrelaxation oscillator to produce a cyclic output oscillation wave with the phase thereof locked to the phase of an input wave applied to said oscillator, and at a frequency which may be different from the natural frequency of said oscillator or from any frequency spectrally represented in said input wave, said method comprising the steps of adjusting the frequency of said oscillator approximately to a frequency bearing a rational fractional relationship with respect to a frequency spectrally represented in said input wave, observing on an oscilloscope a trace produced by deflections in one direction produced by said input wave and deflections in a perpendicular direction in response to said cyclic oscillation wave, applying said input wave to synchronize said oscillator, and adjusting the amplitude of said input wave to a level which results in a substantially stable repetitive trace on said oscilloscope.

11. An oscillatory system comprising a free-running, nonrelaxation oscillator, means applying synchronizing pulses to said oscillator, means displaying the waveform of said synchronizing pulses with a time base under the control of the output of said oscillator, and means for adjusting the amplitude of said pulses to produce substantial stability in said display.

12. The oscillatory system in accordance with claim 11 in which said synchronizing pulses comprise a noncyclic train of pulses of various widths in random distribution.

13. The oscillatory system in accordance with claim 12 in which said pulse train lacks an energy component producing a spectral line at the output frequency of said oscillator.

14. The oscillatory system in accordance with claim 11 in which said synchronizing pulses comprise a cyclic train of pulses at a frequency which is approximately related to the natural frequency of said oscillator by a rational fraction.

15. The oscillatory system in accordance with claim 11 in which said displaying means comprises an oscilloscope, means applying said synchronizing pulses to the deflection input thereof, and means responsive to the output of said oscillator actuating the sweep input of said oscilloscope.

16. The oscillatory system in accordance with claim 11 in which said oscillator is a Hartley transistor oscillator.

17. The oscillatory system in accordance with claim 11 in which said means applying synchronizing pulses to said oscillator comprises wave shaping means producing impulses in response to a predetermined characteristic of said pulses.

18. The oscillatory system in accordance with claim 11 in which said synchronizing pulses comprise a noncyclic train of pulses, the spectrum of frequencies in said train completely lacking an energy component at a predetermined variable frequency, the range of variation of said frequency including the natural oscillatory frequency of said oscillator, and said means applying synchronizing pulses to said oscillator comprises wave shaping means producing impulses in response to a predetermined characteristic of said pulses, and means responsive to said impulses producing a further noncyclic train of pulses having a frequency spectrum including an energy component at said predetermined variable frequency.

19. The oscillatory system in accordance with claim 11 in which the output of said oscillator includes means further stabilizing said display and comprising a further oscillator having tuning means, a phase comparator receiving inputs from both of said oscillators, means responsive to the output of said phase comparator actuating said tuning means, and an electric connection between the output of said further oscillator and said displaying means.

20. The oscillatory system in accordance with claim 11 in which said applying means comprises a further free-running nonrelaxation oscillator having a circuit portion in common with the first mentioned oscillator, and said adjusting means comprises an adjustable resistor connected in said common circuit portion.

No references cited.